United States Patent
Schecter et al.

(10) Patent No.: US 12,301,051 B2
(45) Date of Patent: *May 13, 2025

(54) POWER DEVICE TERMINAL BACKUP SWITCH UNIT

(71) Applicant: Solaredge Technologies Ltd., Herzeliya (IL)

(72) Inventors: Natan Schecter, Jerusalem (IL); Roni Salman, Jerusalem (IL); Aryeh Zafranski, Jerusalem (IL); Yuval Paz, Haifa (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,493

(22) Filed: Feb. 15, 2024

(65) Prior Publication Data

US 2024/0266864 A1    Aug. 8, 2024

Related U.S. Application Data

(63) Continuation of application No. 17/504,069, filed on Oct. 18, 2021, now Pat. No. 11,955,836.

(60) Provisional application No. 63/093,566, filed on Oct. 19, 2020.

(51) Int. Cl.
*H02J 9/06*    (2006.01)

(52) U.S. Cl.
CPC .................................. *H02J 9/062* (2013.01)

(58) Field of Classification Search
CPC ............ H02J 9/062; H02J 9/063; H02J 9/068
USPC .......................................................... 307/20
See application file for complete search history.

(56) References Cited

U.S. PATENT DOCUMENTS

| 6,100,605 A | 8/2000 | Zajkowski |
| 11,955,836 B2* | 4/2024 | Schecter ................. H02J 9/068 |
| 2013/0049699 A1* | 2/2013 | Jayaraman .............. H02M 1/10 |
| | | 320/137 |
| 2014/0117764 A1 | 5/2014 | Navarro |

FOREIGN PATENT DOCUMENTS

| EP | 1120879 A1 | 8/2001 |
| WO | 2013093066 A1 | 6/2013 |

OTHER PUBLICATIONS

Mar. 29, 2022—Extended EP Search Report—EP App. No. 21203162.9.

* cited by examiner

*Primary Examiner* — Elim Ortiz
*Assistant Examiner* — Xuan Ly
(74) *Attorney, Agent, or Firm* — Banner & Witcoff, Ltd.

(57) ABSTRACT

When a power outage occurs, an uninterruptable power supplies may lose all grid connections including a neutral connection which may be connected to ground. To avoid the loss of a ground connection to the power circuits of the UPS, a switch unit may be used to selectively connect a neutral conductor of the circuit to a ground terminal. The switch unit may comprise a power relay, a fast switch device (FSD), and a controller. The power relay and FSD may be connected in series between the neutral conductor of the circuit and a ground terminal. The controller may be configured to: close the FSD when the voltage between ground and neutral (Vng) goes above a first threshold, open the FSD when the voltage between any grid connection and neutral (Vg) goes above a second threshold, and close the FSD when Vg is below the second threshold.

20 Claims, 5 Drawing Sheets

Vng — Voltage, Neutral to Ground
Vg — Voltage, Grid

POWER DEVICE TERMINAL BACKUP SWITCH UNIT

CROSS-REFERENCE TO RELATED APPLICATIONS

This application is a continuation of U.S. application Ser. No. 17/504,069, filed Oct. 18, 2021, which claims priority to U.S. Provisional Application No. 63/093,566 filed on Oct. 19, 2020, and entitled "Power Device Terminal Backup Switch Unit." The foregoing applications are incorporated herein by reference in their entireties.

BACKGROUND

The present disclosure relates to the field of electric components and devices containing electric components.

Uninterruptable power supplies (UPSs) may include a battery, a grid connection, a load connection, and power conversion circuits to (a) charge the battery from the grid, and (b) discharge the battery to one or more of the loads. A ground connection for the power conversion circuits may be supplied through the grid connection when the neutral conductor of the grid connection is electrically connected to ground. Relays may be used to connect the terminals of a power device, such as a UPS power device, a direct current (DC) to DC power conversion device, an alternating current (AC) to DC power conversion device, a DC to AC power conversion device, or an AC to AC power conversion device. For example, contactors may be a type of power relay including three poles for a three-phase grid power and including a fourth pole for grid neutral.

SUMMARY

The following summary is a short summary of some of the inventive concepts for illustrative purposes only and is not an extensive overview, and is not intended to identify key or critical elements, or to limit or constrain the inventions and examples in the detailed description. One skilled in the art will recognize other novel combinations and features from the detailed description.

Devices and methods are disclosed for providing backup terminal connections that may be configured to respond to electrical network conditions. For example, a ground terminal may be connected to a neutral terminal of an uninterruptible power supply (UPS) for use during a grid outage. Other example applications of ground terminal backup connections may include power supplies connected to electrical networks where a neutral terminal may be used as a common ground connection (such as whole house electrical backup systems), inverters with a battery backup, or power conversion devices of power generation and storage systems. Other types of terminals (other than ground or neutral terminals) may also benefit from a backup terminal when intermittent access to a main usage terminal may occur, such as a DC voltage terminal, an AC voltage terminal, a reference terminal, or a communication terminal.

The backup switch units may use a power relay and a fast switch device (FSD) in series between the device conductor and the backup terminal, such as between a neutral conductor of a power device (or load) and a terminal connected to electrical ground. An FSD may comprise a solid-state relay, such as a semiconductor device, silicon-controlled rectifier, transistor, or a triac. For example, a FSD may use two metal-oxide-semiconductor field-effect transistor (MOSFET) transistors in a transmission gate arrangement. A transmission gate arrangement may be a "back-to-back" configuration of unidirectional devices, such that a single gate may control the switching of one or more devices to switch between a bidirectional short circuit and an open circuit (such as between two conductors or terminals).

During operation, a controller may be configured to use the FSD to switch the backup terminal connection in response to the electrical parameters of the connected electrical network and devices. The power relay in series may be operated by the controller to disconnect the FSD in case of a malfunction of the FSD during operation. This combination of a configured controller, power relay, and FSD may provide the benefits of fast switching to reliably connect or disconnect a power terminal of a power device responsive to the electrical parameters of the electrical network or connected devices.

As noted above, this summary is merely a summary of some of the aspects and features described herein. It is not exhaustive, and it is not intended to delineate the scope of the claims.

BRIEF DESCRIPTION OF THE DRAWINGS

Certain features, aspects, and advantages of the present disclosure will become better understood with regard to the following description, claims, and drawings. The present disclosure is illustrated by way of example, and not limited by, the accompanying figures. In the drawings, like numerals reference similar elements.

DESCRIPTION

Details provided herein describe aspects of devices and methods for, for example, using a fast switch device (FSD), a power relay, and a uniquely configured controller (collectively referred to herein as a backup switch unit) to electrically connect or disconnect a power terminal of a power device. The backup switch unit may be a subsystem of the power device. The controller may be configured to monitor electrical parameters of the power device and electrical network. Responsive to the electrical parameters, the controller may be configured to determine the operation of the FSD and the power relay.

For example, in an uninterruptible power supply (UPS), a neutral terminal of an alternating current (AC) external electrical network (such as an electrical grid network) may also be used to supply an electrical ground terminal (GND) to one or more power devices, such as loads of a local electrical network. When the grid is disconnected from the local electrical network, the devices of the local electrical network may lose their ground connection supplied by the neutral terminal. When such a situation occurs, the controller (of the backup switch unit) may be configured to operate the FSD to electrically connect the neutral terminal of the UPS device to an alternate ground terminal available to the local electrical network. The controller may be configured to monitor electrical parameters of terminals connected to the UPS power device, or to receive sensor measurements from external sensors. The controller may be configured to monitor the electrical parameters that determine a change in the operation of the FSD or power relay. The controller may be configured to monitor the electrical parameters that determine a change in the operation of the electrical network (such as using external sensors).

Figure 1A:
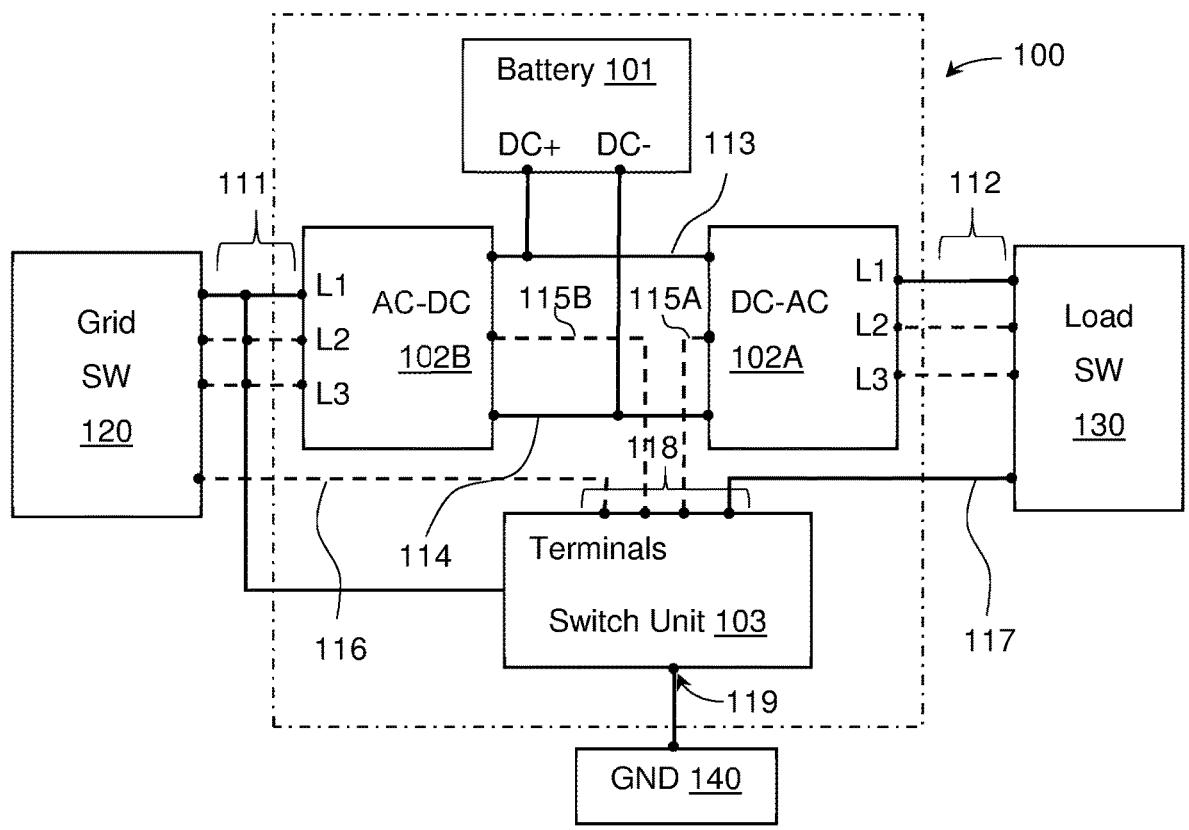
FIG. 1A shows a block diagram of an illustrative uninterruptible power supply including a backup switch unit.

Reference is now made to FIG. 1A, which shows a block diagram of an illustrative UPS 100 including a backup switch unit 103. The illustrative example of UPS 100 is configured as a dual stage converter with separate DC-AC converter 102A and AC-DC converter 102B, but other configurations with a backup switch unit are possible (such as a bidirectional conversion circuit configuration, or a hybrid conversion circuit configuration). A load switch 130 may be electrically connected to DC-AC converter 102A, such as one or more load conductors 112 (L1, L2, L3, ... ). A grid switch 120 may be electrically connected to grid input terminals 111 (L4, L5, L6, ... ) of AC-DC converter 102B. Respective terminals of DC-AC converter 102A and AC-DC converter 102B may be connected to battery 101 terminal DC+ 113 and terminal DC− 114. A neutral terminal of DC-AC converter 102A may be connected to backup switch unit 103 using a first device neutral 115A conductor. A neutral of AC-DC converter 102B may be connected to backup switch unit 103 using a second device neutral 115B conductor. Backup switch unit 103 may comprise multiple neutral terminals 118, and may be electrically connected to load switch 130 using load neutral 117 and grid switch 120 using grid neutral 116. This allows the backup switch unit 103 to selectively connect one or more neutrals to ground in case of a power outage.

Backup switch unit 103 may be electrically connected, using a ground terminal and conductor 119 to a ground reference, such as an external ground 140. The backup switch unit 103 may operate autonomously (e.g., using a controller configured with predetermined instructions), such as based on electrical parameters measured from the power device 100, the electrical network, or one of the loads. Device neutrals 115A or 115B may be electrically connected to power converter components, such as a DC-link midpoint or inverter neutral of the respective circuits 102A and 102B. For example, when a particular power device topology includes a DC-link midpoint, the load neutral 117 may be electrically connected to neutrals 115A and 115B, and through the backup switch unit 103. For example, the device neutrals 115A and 115B, grid neutral 116, and load neutral 117 may all be electrically connected to the backup switch unit 103.

Figure 1B:
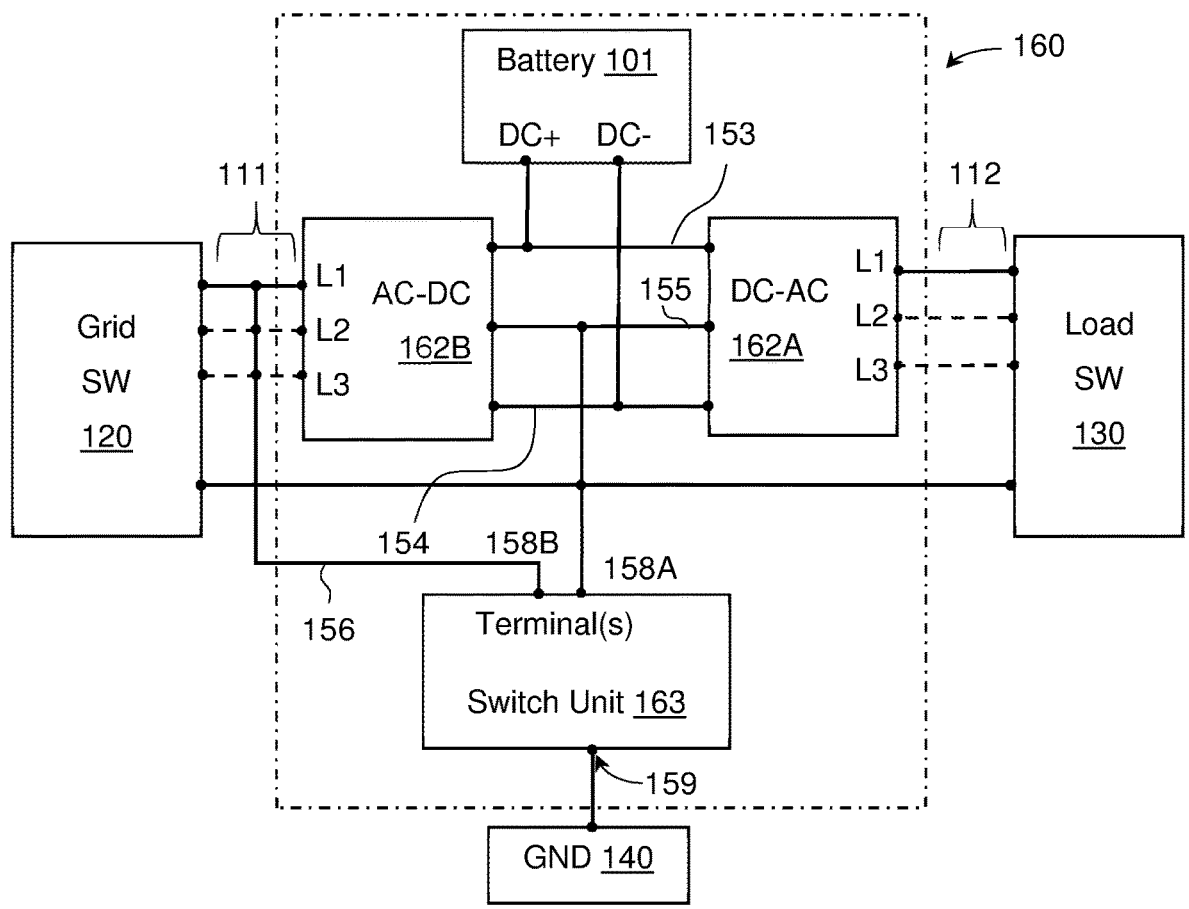
FIG. 1B shows a block diagram of an illustrative uninterruptible power supply including a backup switch unit.

Reference is now made to FIG. 1B, which shows a block diagram of an illustrative UPS 160 including a backup switch unit 163. The illustrative example of UPS 100 is configured as a dual stage converter with separate DC-AC converter 162A and AC-DC converter 162B, but other configurations with a backup switch unit are possible (such as a bidirectional conversion circuit configuration, or a hybrid conversion circuit configuration). A load switch 130 may be electrically connected to DC-AC converter 162A, such as one or more load conductors 112 (L1, L2, L3, ... ). A grid switch 120 may be electrically connected to grid input terminals 111 (L4, L5, L6, ... ) of AC-DC converter 162B. Respective terminals of DC-AC converter 162A and AC-DC converter 162B may be connected to battery 101 terminal DC+ 113 and terminal DC− 114. A common neutral of DC-AC converter 162A and AC-DC converter 162B may be connected to a terminal 158A of backup switch unit 163. The common neutral may be connected to the neutrals of grid switch 120 and load switch 130. Backup switch unit 163 may be electrically connected, using a ground terminal and conductor 159 to an alternative reference, such as an external ground 140. The backup switch unit 163 may operate autonomously (e.g., using a controller configured with predetermined instructions), such as based on electrical parameters measured from the power device 160, the electrical network, or one of the loads.

Figure 2A:
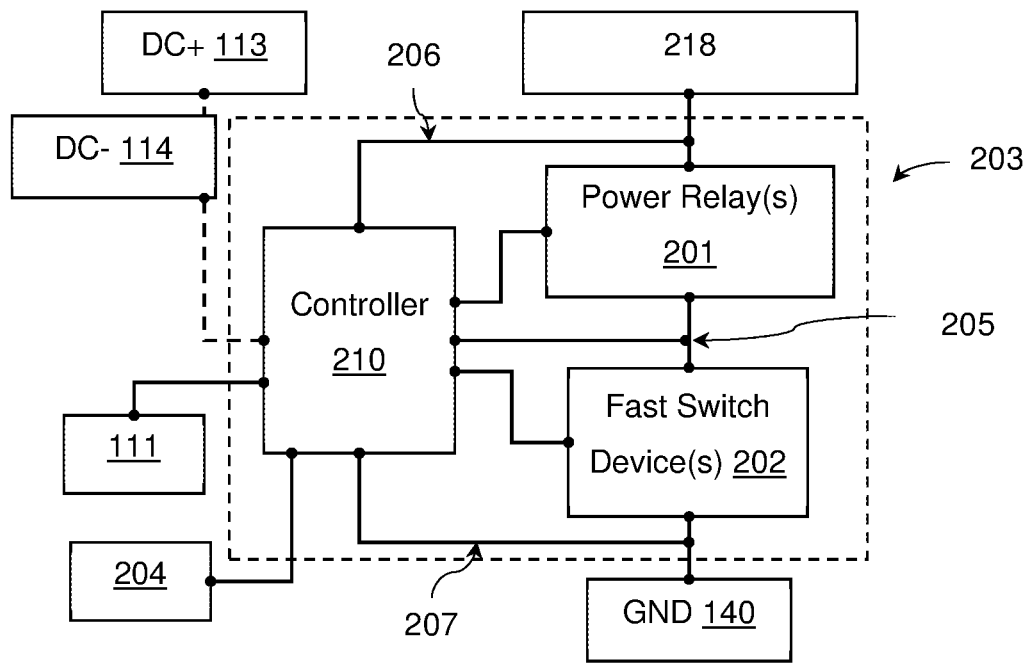
FIG. 2A shows a block diagram of illustrative components of a backup switch unit.

Reference is now made to FIG. 2A, which shows a block diagram of illustrative components of a backup switch unit 203. Backup switch unit 203 comprises power relay(s) (PR) 201, a fast switch device(s) (FSD) 202, and a controller 210. Fast switch device 202 may comprise a solid-state switch, a solid state relay, a triac, or an analogue switch. Similarly, fast switch device(s) 202 may comprise two transistors, or silicon controlled rectifiers (SCRs) in transmission gate configuration (or a "back-to-back" configuration). The power relay(s) 201 and the fast switch device(s) 202 may be electrically connected in series between an external conductor, such as a load neutral conductor 218 and an alternative reference conductor (such as a GND conductor 119 of FIG. 1A or conductor 159 of FIG. 1B) to an external GND reference 140. Controller 210 may be configured to operate power relay(s) 201 and the fast switch device(s) 202 responsive to electrical parameters of the power device and electrical network.

FIG. 2A illustrates a single serial connection between neutral 218 and GND 140, but in UPS devices such as 100 of FIG. 1A, the switch unit 103, there, may include several neutral terminals 118 to connect to GND 140. Each neutral terminal may have a separate connection with one of the multiple power relay(s) 201 and the fast switch device(s) 202 for each separate neutral connection. Alternatively, two or more neutral connections may be combined to use the same one of the multiple power relay(s) 201 and the fast switch device(s) 202. Each separate neutral connection may be independent, such that the methods and devices described herein may apply to each separate neutral connection.

Electrical parameters of the power device may include the voltage difference between neutral terminals 218 and GND reference 140 using conductors 206 and 207. Electrical parameters of the power device may include the voltage difference between another neutral conductor (115A, 115B, or 116) and GND 119. Electrical parameters of the power device 100 or 160 may include the voltage difference between any grid input terminals 111 and neutral 117. Electrical parameters of the electrical network, such as magnitude, frequency, and phase of voltage or current at a location of the electrical network, may be collected by one or more external electrical sensors 204. The controller 210 may use a current sensor to monitor current between the grid and loads to determine when the grid is disconnected from a load, or when the grid is reconnected to a load. For example, the controller 210 may use a current sensor 205 to monitor the current through the fast switch(s) 202. The controller 210 may operate a formula or look up table to correct a voltage measurement for underlying voltage differences between the neutral and ground during normal operation. Controller 210 may be electrically connected to a power source, such as the DC+ terminal 113 or DC− terminal 114 of the battery 101, or an auxiliary power supply.

The power relay(s) 201 may switch between a conducting (closed) state and a non-conducting (open) state within a time greater than a few milliseconds (ms) (such as greater than 2 ms, greater than 5 ms, greater than 10 ms, and so on) depending on the particular relay electrical and mechanical design. Some electrical networks may comprise power devices (such as loads, inverters, or chargers) that may reset (or otherwise malfunction) when losing an electrical connection to ground or to the grid neutral conductor for a time longer than a few milliseconds. For example, a particular network device may reset after losing ground for greater than 2 ms, greater than 5 ms, greater than 10 ms, and so on, depending on the particular device design.

During normal operation, the backup switch unit 103 or 163 may start with power relay closed and fast switch device open. To limit reset or malfunction of the electrical network devices, the backup switch unit 103 or 163 may close fast switch device(s) 202 to electrically connect an alternative terminal, such as a ground terminal, when the grid is disconnected from the local electrical network. When the grid is reconnected to the power device, the fast switch device(s) 202 may be opened. When fast switch device(s) 202 fails, the controller may be configured to open the power relay to reduce the likelihood of multiple electrical connections not allowed for safety and compliance reasons, and an alert may be sent to an operator of the power device. For example, many local regulations may require that two ground connections are not connected concurrently in an electrical system, so a backup ground connection may monitor sensors to determine when another ground is connected and disconnect the backup connection.

As many power backup systems may comprise several backup power generators, such as batteries, diesel-fuel generators, wind generators, or the like, the backup switch unit 103 or 163 operation may be initiated when the loads are disconnected from the grid, and the backup switch unit 103 or 163 may connect an alternate reference terminal, such as GND 140, when the battery backup generator is activated. When another backup generator that has a grounded connection, such as a diesel engine, is brought online to provide electrical power to the loads, the backup switch unit 103 or 163 may be opened (this may have the advantage of promoting compliance with local regulations or electrical codes).

Figure 2B:
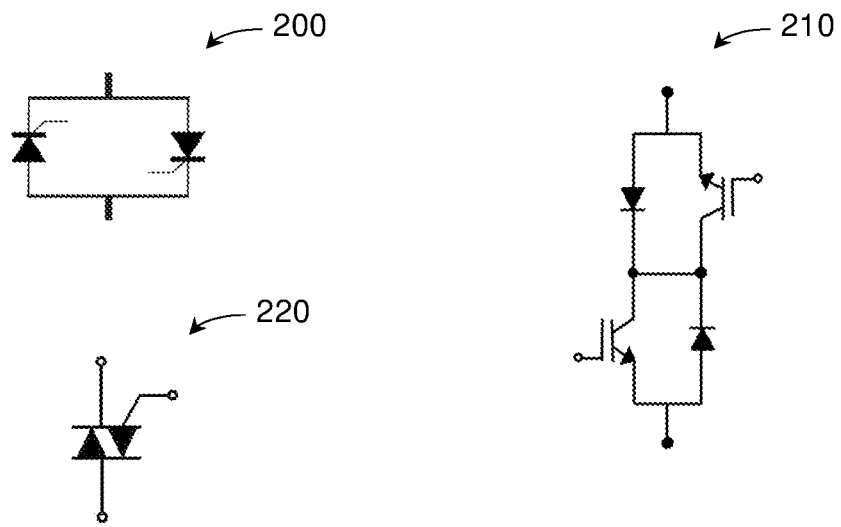
FIG. 2B shows illustrative components for use in a fast switch device.

Reference is now made to FIG. 2B, which shows illustrative components for use in a fast switch device 202. To implement a fast switch device 202, two SCRs may be configured as at 200. Other implementations of a fast switch device 202 may use a triac (as may be shown at 220), two metal-oxide-semiconductor field-effect transistor (MOSFET) transistors in a transmission gate arrangement (as may be shown at 210), two bipolar junction transistors in a transmission gate arrangement, or two insulated-gate bipolar transistors in a transmission gate arrangement. Each type of gated silicon device may have relative strengths and weaknesses, and the choice may depend on the voltage and current profiles that the switch will operate under, as well as the intended lifetime.

Figure 3A:
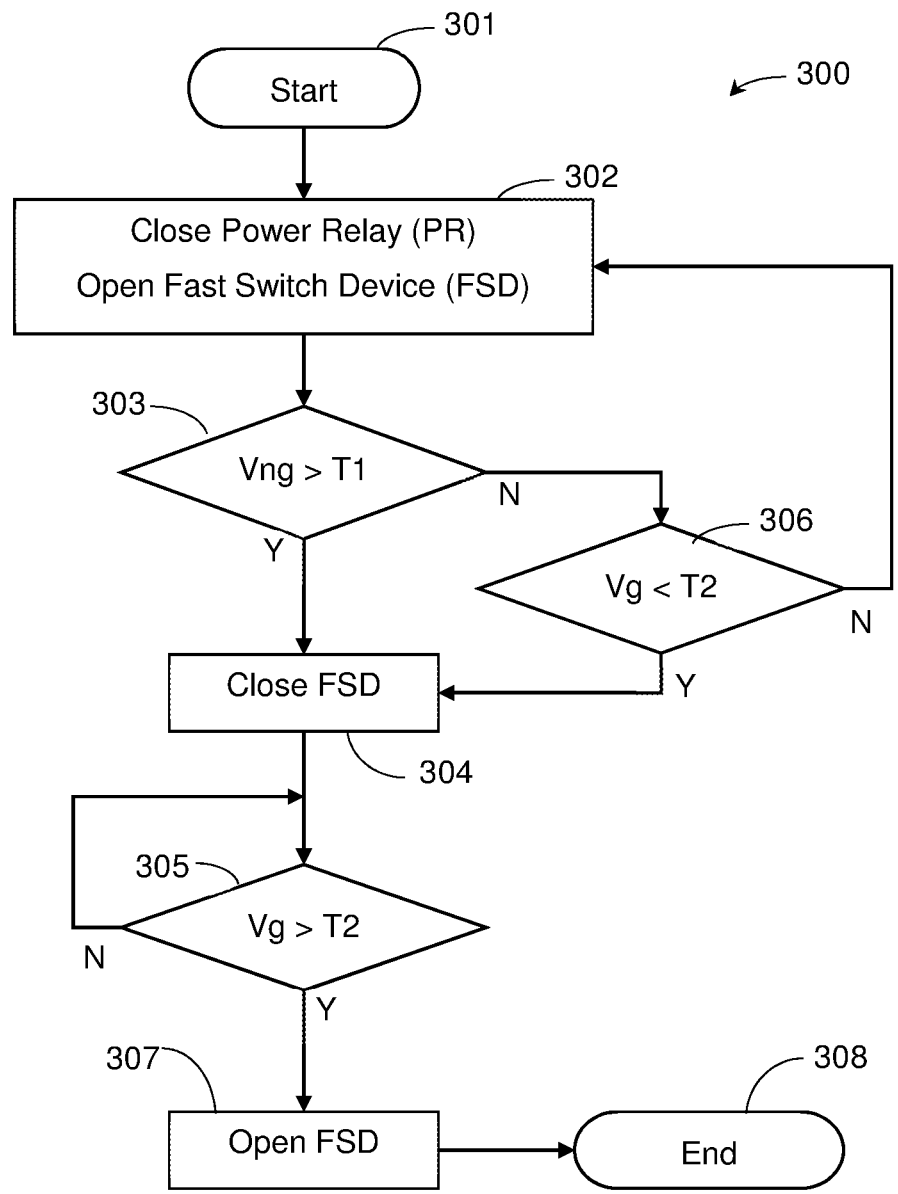
FIG. 3A shows a flowchart of an illustrative method for operating a backup switch unit.

Reference is now made to FIG. 3A, which shows a flowchart 300 of an illustrative method for operating a backup switch unit 103. The method starts at step 301, such as on startup of a UPS device 100 or 160. At step 302, power relay(s) (PR) 201 may be closed and the fast switch device(s) (FSD) 202 may be opened. At step 303, the voltage between the neutral conductor and ground, denoted Vng, may be measured. For example, Vng is the voltage difference between grid neutral and GND 140. For example, Vng is the voltage difference between a common neutral 218 and GND 140. If Vng is above a first threshold T1, the method may proceed to step 304 and the FSD 202 may be closed.

Else, the method may proceed to step 306. Threshold T1 may be 2 volts or greater. Vng measurements may be dynamically corrected based on the instantaneous current being supplied to the loads, or to compensate for any voltage drops between the load neutral and ground conductors due to wiring issues (such as ground or neutral wire gauge below code compliance). For example, a current sensor measurement may be used to compute a compensating voltage value. For example, voltage measurements (at known currents) may be used to compute a compensating voltage value. At step 305, the voltage between any grid input terminals 111 and a neutral reference (such as neutral conductor 116 of a common neutral 218), denoted Vg, may be measured. If Vg is above a second threshold T2, the method may proceed to step 307 and the FSD 202 may be opened. Else, the method may continue monitoring Vg till the grid voltage is restored. Threshold T2 may be 20 volts or greater, or may alternatively be determined by external sensor (such as current measurement between grid and loads). At step 306, Vg may be measured, and when Vg is below the second threshold T2, the method may proceed to step 304 and the FSD 202 may be closed. At step 306, when Vg is above the second threshold T2, the method proceeds to step 302. At step 308 the method may end, or may repeat by initiating another cycle at step 301.

Figure 3B:
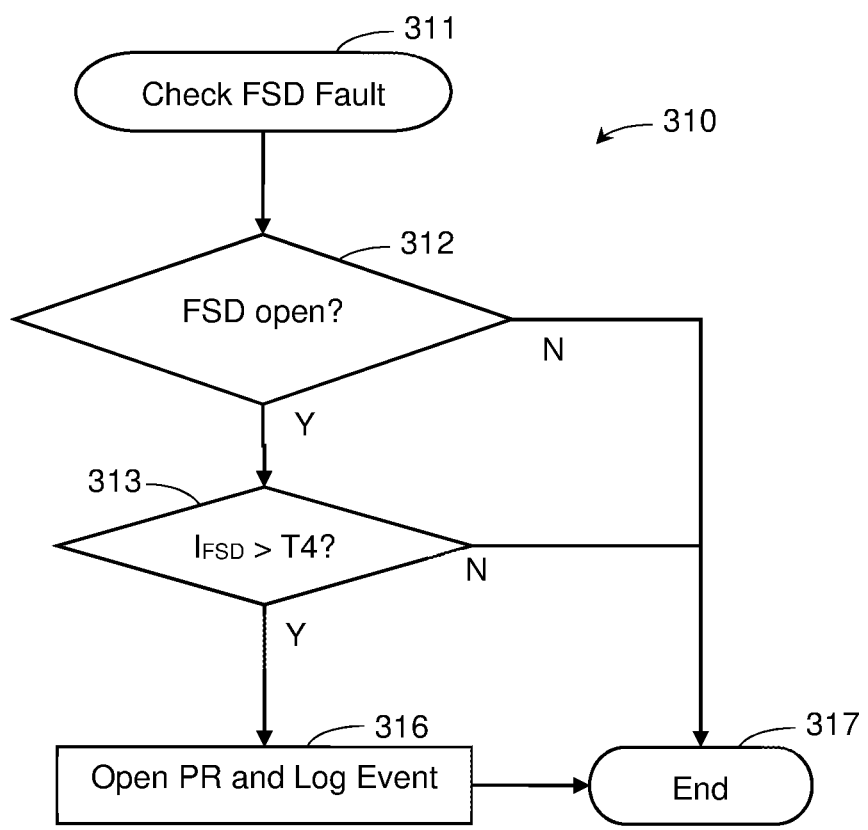
FIG. 3B shows a flowchart of an illustrative method for testing a fast switch device fault of a backup switch unit.

Reference is now made to FIG. 3B, which shows a flowchart 310 of an illustrative method for testing a fast switch device fault of a backup switch unit 103 or 163. At step 311 the fault check of the FSD is started. At step 312 the FSD is checked, and when the FSD is closed the process terminates. When the FSD is open, at step 313 the current through the FSD is measured ($I_{FSD}$), such as using the sensor 205 of FIG. 2A, and compared with a fourth threshold T4. When $I_{FSD}$ is above the threshold T4 the FSD is malfunctioning and at step 316 the PR is opened and an event is logged for the operator. At step 317 the method ends. The threshold T4 may be between 30 and 1000 milliamperes (mA). For example, the threshold is 30 mA, 40 mA, 50 mA, 75 mA, 100 mA, 150 mA, 200 mA, 300 mA, 500 mA, 750 mA, or 1000 mA. For example, a leakage current through a fast switch device is measured to be 35 mA with a tolerance of plus or minus 10 mA, and a threshold of 100 mA is set for T4. For example, a leakage current through a fast switch device is measured to be 35 mA with a tolerance of plus or minus 10 mA, and a threshold of between 50 and 150 mA is set for T4.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A power device comprising:
   one or more input terminals;
   one or more output terminals;
   an input power conversion circuit;
   an output power conversion circuit;
   a backup switch unit, wherein the backup switch unit comprises:
      a controller,
      a power relay, and
      a fast switch device; and a neutral conductor, wherein the neutral conductor is electrically connected between the input power conversion circuit and the output power conversion circuit, wherein the power relay is in a closed configuration on startup, wherein the fast switch device is in an open configuration on startup, and wherein the controller is configured to:
close the fast switch device responsive to a voltage difference between the neutral conductor and a ground terminal being greater than a first threshold,
open the fast switch device responsive to a voltage difference between the neutral conductor and the one or more input terminals being greater than a second threshold, and
close the fast switch device responsive to a voltage difference between the neutral conductor and the one or more input terminals being less than the second threshold.

2. The power device of claim 1, wherein the first threshold is 2 volts, and wherein the second threshold is 20 volts.

3. The power device of claim 1, wherein at least one of the voltage differences is based on a sensor measurement and the at least one of the voltage differences is compensated based on underlying voltage differences between the neutral conductor and the ground terminal during a normal operation of the power device.

4. The power device of claim 1, wherein the power device is configured as an uninterruptible power supply.

5. The power device of claim 1, wherein the one or more input terminals are configured to connect to an alternating current (AC) electrical network.

6. The power device of claim 1, wherein the one or more output terminals are configured to connect to electrical loads.

7. The power device of claim 1, wherein the one or more input terminals comprise an input neutral terminal, wherein the one or more output terminals comprise an output neutral terminal, and wherein the input neutral terminal and the output neutral terminal are electrically connected.

8. The power device of claim 1, wherein the input power conversion circuit comprises an input neutral conductor electrically connected to an input neutral terminal and an output neutral terminal.

9. The power device of claim 1, further comprising an energy storage device, wherein the input power conversion circuit is electrically connected between the one or more input terminals and the energy storage device.

10. The power device of claim 1, further comprising an energy storage device, wherein the input power conversion circuit is configured to receive AC electrical power from the one or more input terminals and supply direct current (DC) power to the energy storage device.

11. The power device of claim 1, further comprising an energy storage device, wherein the output power conversion circuit is electrically connected between the energy storage device and the one or more output terminals.

12. The power device of claim 1, further comprising an energy storage device, wherein the output power conversion circuit is configured to receive DC electrical power from the energy storage device and supply AC power to the one or more output terminals.

13. The power device of claim 1, wherein the output power conversion circuit comprises an output neutral conductor electrically connected to an input neutral terminal and an output neutral terminal.

14. The power device of claim 1, wherein the power relay and the fast switch device of the backup switch unit are connected in series between a ground terminal and the neutral conductor.

15. The power device of claim 1, wherein the energy storage device comprises a battery.

16. A system comprising:
an AC power source;
a plurality of loads
an uninterruptable power supply comprising:
one or more output terminals;
an input power conversion circuit;
an output power conversion circuit;
an energy storage device, wherein the input power conversion circuit is electrically connected between the one or more input terminals and the energy storage device one or more input terminals; and
a backup switch unit, wherein the backup switch unit comprises:
a controller,
a power relay, and
a fast switch device;
a neutral conductor, wherein the neutral conductor is electrically connected between the input power conversion circuit and the output power conversion circuit, wherein the power relay is in a closed configuration on startup, wherein the fast switch device is in an open configuration on startup, and wherein the controller is configured to:
close the fast switch device responsive to a voltage difference between the neutral conductor and a ground terminal being greater than a first threshold,
open the fast switch device responsive to a voltage difference between the neutral conductor and the one or more input terminals being greater than a second threshold, and
close the fast switch device responsive to a voltage difference between the neutral conductor and the one or more input terminals being less than the second threshold.

17. The system of claim 16, wherein the first threshold is 2 volts, and wherein the second threshold is 20 volts.

18. The system of claim 16, wherein at least one of the voltage differences is based on a sensor measurement and the at least one of the voltage differences is compensated based on underlying voltage differences between the neutral conductor and the ground terminal during a normal operation of the power device.

19. The system of claim 16, wherein the one or more input terminals comprise an input neutral terminal, wherein the one or more output terminals comprise an output neutral terminal, and wherein the input neutral terminal and the output neutral terminal are electrically connected.

20. The system of claim 16, wherein the input power conversion circuit comprises an input neutral conductor electrically connected to an input neutral terminal and an output neutral terminal.

* * * * *